United States Patent
Nozoe et al.

(10) Patent No.: US 12,359,073 B2
(45) Date of Patent: Jul. 15, 2025

(54) AQUEOUS COATING-FILM-FORMING COMPOSITION FOR FORMING LUBRICATING COATING FILM, AND AIR BAG USING SAID COMPOSITION

(71) Applicant: DOW TORAY CO., LTD., Tokyo (JP)

(72) Inventors: Tsugio Nozoe, Ichihara (JP); Kazuhiko Kojima, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 565 days.

(21) Appl. No.: 17/620,372

(22) PCT Filed: Jun. 12, 2020

(86) PCT No.: PCT/JP2020/023277
§ 371 (c)(1),
(2) Date: Dec. 17, 2021

(87) PCT Pub. No.: WO2020/255984
PCT Pub. Date: Dec. 24, 2020

(65) Prior Publication Data
US 2022/0235230 A1    Jul. 28, 2022

(30) Foreign Application Priority Data
Jun. 21, 2019    (JP) ............................... 2019-115215

(51) Int. Cl.
*C09D 5/02*      (2006.01)
*B60R 21/235*    (2006.01)
(Continued)

(52) U.S. Cl.
CPC ............ *C09D 5/022* (2013.01); *B60R 21/235* (2013.01); *C09D 7/43* (2018.01); *C09D 7/61* (2018.01);
(Continued)

(58) Field of Classification Search
CPC ....... C09D 183/04; C08L 83/08; C08L 33/02; C08L 71/02; C08L 83/00; C08K 9/00; C08K 3/346; C08K 3/36; C08K 5/5419
See application file for complete search history.

(56) References Cited

U.S. PATENT DOCUMENTS

| | | | |
|---|---|---|---|
| 5,789,084 A | 8/1998 | Nakamura et al. | |
| 5,844,742 A | 12/1998 | Yarmchuk et al. | |

(Continued)

FOREIGN PATENT DOCUMENTS

| | | |
|---|---|---|
| EP | 0915122 A1 | 5/1999 |
| EP | 3988618 A1 | 4/2022 |

(Continued)

OTHER PUBLICATIONS

Machine assisted English translation of JPH0673291 obtained from https://patents.google.com/patent on Apr. 18, 2022, 8 pages.

(Continued)

*Primary Examiner* — Anthony J Frost
(74) *Attorney, Agent, or Firm* — Warner Norcross + Judd LLP

(57) ABSTRACT

An aqueous coating film-forming composition is provided that can be coated uniformly on a silicone rubber surface without causing repelling or coating failure even when applied to the silicone rubber surface at a film thickness of 30 μm or less, and forms an antifriction dry coating film that reduces friction and/or blocking of the substrate surface on the surface. The composition comprises (A) a solid lubricant, (B) a thickener, and (C) a silicone binder in the form of an oil-in-water silicone emulsion comprising (c1) an ionic emulsifier and (c2) a polyoxyethylene-polyoxypropylene copolymerized nonionic emulsifier. Water content is removed from the composition to form an antifriction dry coating film comprising 40 to 80 mass % of component (A), 0.50 to 10 mass % of component (B), 0.60 to 5 mass % of (Continued)

component (c2), and 5 to 49.5 mass % of component (C) (solid fraction). Applications thereof are also provided, e.g. airbag coatings.

11 Claims, 1 Drawing Sheet

(51) Int. Cl.
  *C09D 7/43* (2018.01)
  *C09D 7/61* (2018.01)
  *C09D 7/65* (2018.01)
  *C09D 183/08* (2006.01)
  *D06N 3/12* (2006.01)

(52) U.S. Cl.
  CPC ............. *C09D 7/65* (2018.01); *C09D 183/08* (2013.01); *D06N 3/128* (2013.01); *B60R 2021/23504* (2013.01); *D06N 2209/108* (2013.01); *D06N 2211/268* (2013.01)

(56) References Cited

U.S. PATENT DOCUMENTS

| | | | |
|---|---|---|---|
| 5,877,256 A | 3/1999 | Nakamura et al. | |
| 6,177,365 B1 | 1/2001 | Li | |
| 6,177,366 B1 | 1/2001 | Li | |
| 6,425,600 B1 | 7/2002 | Fujiki et al. | |
| 6,511,754 B1 | 1/2003 | Bohin et al. | |
| 6,709,752 B1 | 3/2004 | James et al. | |
| 7,198,854 B2 | 4/2007 | Dumont et al. | |
| 2006/0121300 A1 | 6/2006 | Matsumura | |
| 2010/0190395 A1 | 7/2010 | Nozoe et al. | |
| 2010/0190396 A1 | 7/2010 | Nozoe et al. | |
| 2011/0319557 A1 | 12/2011 | Kojima et al. | |
| 2012/0004354 A1* | 1/2012 | Kojima | C09D 183/04 524/500 |
| 2012/0288649 A1* | 11/2012 | Blackwood | D06N 3/128 508/141 |
| 2013/0143989 A1 | 6/2013 | Kojima et al. | |
| 2020/0165454 A1 | 5/2020 | Inokuchi | |

FOREIGN PATENT DOCUMENTS

| | | |
|---|---|---|
| FR | 2848878 A1 | 6/2004 |
| JP | S5616553 A | 2/1981 |
| JP | S59152972 A | 8/1984 |
| JP | H0673291 A | 3/1994 |
| JP | H09165554 A | 6/1997 |
| JP | H10168393 A | 6/1998 |
| JP | H11193349 A | 7/1999 |
| JP | 2003277238 A | 10/2003 |
| JP | 2006159554 A | 6/2006 |
| JP | 2010046907 A | 3/2010 |
| JP | 2010235930 A | 10/2010 |
| JP | 2010235931 A | 10/2010 |
| JP | 2013516522 A1 | 5/2013 |
| WO | 2008020605 A1 | 2/2008 |
| WO | 2008020635 A1 | 2/2008 |
| WO | 2012002571 A1 | 1/2012 |
| WO | 2017007920 A1 | 1/2017 |
| WO | 2019012899 A1 | 1/2019 |

OTHER PUBLICATIONS

Machine assisted English translation of FR2848878A1 obtained from https://worldwide.espacenet.com/patent on Jun. 20, 2023, 27 pages.
Machine assisted English translation of JP2010046907A obtained from https://worldwide.espacenet.com/patent on Jun. 20, 2023, 24 pages.
International Search Report for PCT/JP2020/023278 dated Sep. 1, 2020, 3 pages.
International Search Report for PCT/JP2020/023277 dated Aug. 11, 2020, 2 pages.
Machine assisted English translation of JP2003277238 obtained from https://patents.google.com/patent on Apr. 4, 2022, 8 pages.
Machine assisted English translation of JPH0673291 obtained from https://patents.google.com/patent on Apr. 4, 2022, 4 pages.
Machine assisted English translation of the JPS59152972, obtained from https://patents.google.com/patent on Apr. 4, 2022, 4 pages.
Machine assisted English translation of JPH09165554 obtained from https://patents.google.com/patent on Apr. 4, 2022, 11 pages.
Machine assisted English translation of JPH10168393 obtained from https://patents.google.com/patent on Apr. 4, 2022, 11 pages.
Machine assisted English translation of JPS5616553 obtained from https://patents.google.com/patent on Apr. 4, 2022, 10 pages.

* cited by examiner

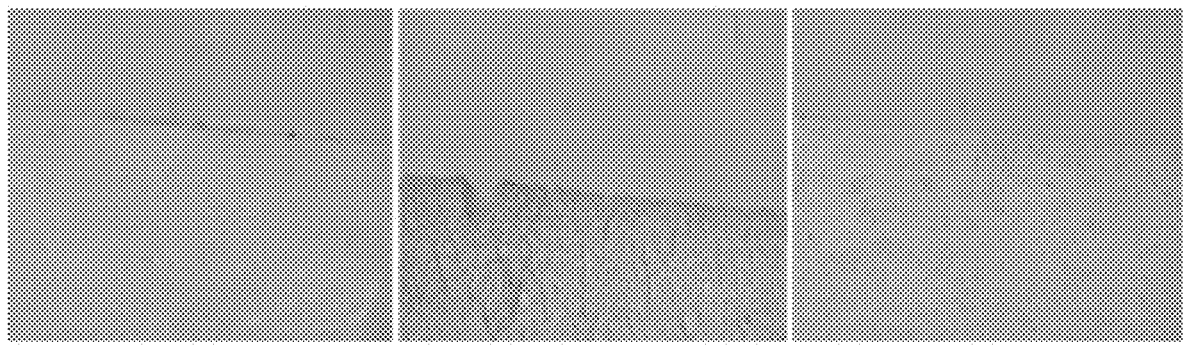

AQUEOUS COATING-FILM-FORMING COMPOSITION FOR FORMING LUBRICATING COATING FILM, AND AIR BAG USING SAID COMPOSITION

CROSS-REFERENCE TO RELATED APPLICATIONS

This application is the National Stage of International Appl. No. PCT/JP2020/023277 filed on 12 Jun. 2020, which claims priority to and all advantages of Japanese Appl. No. 2019-115215 filed on 21 Jun. 2019, the content of which is hereby incorporated by reference.

TECHNICAL FIELD

The present invention relates to an aqueous coating film-forming composition which, when applied to a silicone rubber surface, can form a coating film having excellent uniformity without causing repelling or coating failure even when applied in a thin film form with a low application rate and a thickness of 30 µm or less, and which is applied on a surface of a substrate and forms an antifriction dry coating film that reduces friction and/or blocking of the substrate surface on the surface by removing water content. The present invention particularly relates to: an aqueous coating film-forming composition suitable for application as an upper coating onto a silicone rubber surface of an airbag and airbag fabric coated with a base coating of silicone rubber (hereinafter, may be expressed as "silicone elastomer"); a method of surface treating a substrate using the composition; and a substrate material, and particularly an airbag, provided with the aforementioned antifriction dry coating film.

BACKGROUND ART

Airbags are generally fabricated from a woven or knitted material made of a synthetic fiber, for example a polyamide such as nylon-6,6, polyester, or the like, and at least one surface thereof is coated with a layer of elastomer. The airbag may be fabricated from a flat piece of fabric that is coated and then stitched together to provide sufficient mechanical strength, or may be woven into a single piece that is integrally woven and has a seam. Stitched airbags are typically combined with a coated fabric surface inside the airbag. For the airbag woven into a single piece, an outer side of the airbag is covered. A preferred elastomer for coating an airbag or airbag fabric is a silicone elastomer, which is a cured organopolysiloxane composition, and particularly a silicone rubber coating film that is cured by hydrosilylation, in other words, by a reaction between an alkenyl group of one polyorganic siloxane and an Si—H group of another silicon-containing material, such as a polyorganosiloxane, silane, or the like.

Herein, airbags coated using a silicone rubber (silicone elastomer) are described in a number of published patents and applications, for example, Patent Documents 1 to 7.

If an elastomeric base coating is the only coating film on an airbag, surface properties of the base coating can lead to blocking (in particular, elastomeric coated surfaces adhering to each other during storage at high ambient temperatures and during dense filling of the airbag in a vehicle) and very high stress when the airbag is expanded, which will lead to bag defects due to tearing during expansion or by releasing of the elastomeric base coating from a fabric. Blocking between elastomer surfaces is also a problem during airbag manufacturing when elastomer-coated fabrics are stored in a roll. Furthermore, many elastomers, such as silicone elastomer coatings and the like, have high surface friction when cured.

Patent Documents 8 and 9 describe an airbag coating film containing at least two separate layers. A first layer (base coating) contacting an airbag surface contains a non-silicone composition prepared from polyurethane, polyacrylate, polyamide, butyl rubber, hydrogenated nitrile rubber or an ethylene vinyl acetate copolymer. A second layer (upper coating) is a silicone material.

Patent Document 9 describes an airbag coating film composition containing at least two separate and different layers. A first layer (base coating) contacting an airbag surface contains a silicone elastomer. A second layer (upper coating) is preferably a silicone resin.

Patent Document 10 describes an antifriction silicone varnish for fabrics coated with a silicone elastomer. The varnish contains a cross-linkable silicone composition containing two silicones that react with each other in the presence of a catalyst that permits cross-linking, and a particulate component containing a powdered (co)polyamide.

Furthermore, in Patent Document 11, the present applicant proposes an aqueous coating film composition containing a solid lubricant, a clay mineral or other thickener, and a binder resin, which is suitable for application as an upper coating to an airbag or the like coated with a base coating such as an elastomer or the like to form an antifriction coating film that reduces friction and the like. The composition can form an antifriction coating film that reduces friction and/or blocking on an airbag/airbag fabric or the like coated with a silicone elastomer.

However, these documents do not describe or suggest any aqueous coating film compositions that form an antifriction coating film using a silicone binder that contains an oil-in-water silicone emulsion containing a specific combination of emulsifiers, and particularly a polyorganosiloxane with a high degree of polymerization.

PRIOR ART DOCUMENTS

Patent Documents

[Patent Document 1] U.S. Pat. No. 5,789,084
[Patent Document 2] U.S. Pat. No. 5,877,256
[Patent Document 3] U.S. Pat. No. 6,709,752
[Patent Document 4] U.S. Pat. No. 6,425,600
[Patent Document 5] U.S. Pat. No. 6,511,754
[Patent Document 6] International Publication No. 08/020605 Pamphlet
[Patent Document 7] International Publication No. 08/020635 Pamphlet
[Patent Document 8] U.S. Pat. No. 6,177,365
[Patent Document 9] U.S. Pat. No. 6,177,366
[Patent Document 10] U.S. Pat. No. 7,198,854
[Patent Document 11] Japanese Unexamined Patent Application 2013-516522 (Japanese Patent No. 5844742)

SUMMARY OF THE INVENTION

Problems to be Solved by the Invention

On the other hand, the present applicant has discovered a new problem with the aqueous coating film composition in the aforementioned Patent Document 11. An airbag or the like requiring an antifriction coating film have recently required a functional coating film/coating layer on a substrate surface to be applied with a low coating weight, and particularly in the form of a thin film of 30 μm or less, from the perspective of reducing weight. However, when the aqueous coating film composition (coating agent for the upper coating layer) described in Patent Document 11 and the like is attempted to be applied thinly onto a silicone rubber surface, coating film repelling may occur, and thus the silicone rubber surface on the substrate may not be uniformly coated.

In view of the foregoing, an object of the present invention is to provide an aqueous coating film-forming composition that can be coated uniformly on a silicone rubber surface without causing repelling or coating failure even when applied in the silicone rubber surface at a film thickness of 30 μm or less, and forms an antifriction dry coating film that reduces friction and/or blocking of the substrate surface on the surface.

Furthermore, an object of the present invention is to provide an application of the aqueous coating film-forming composition, and particularly a use for forming an antifriction dry coating film that reduces friction or blocking of a substrate surface on a substrate provided with a silicone rubber surface, as well as a substrate provided with the dry coating film, and particularly an airbag or a coating fabric subsequently formed into an airbag. Furthermore, an object is to provide a surface treating method in which the aqueous coating film-forming composition, and a method of manufacturing an airbag or a coating fabric subsequently formed into an airbag, provided with the surface treating method.

On the other hand, the present inventors discovered a new problem for the aforementioned application. In other words, the present inventors discovered a new problem where, particularly when a silicone rubber base coating material is used as a base coating material for an airbag, if an additive reaction type silicone rubber top coating is used on the base coating material, a component of the top coating and a component of the base coating react based on a heat aging resistance test over a long period of time and at high temperatures. Thus, the surface of the base coating solidifies, and cracks are easily generated. The problem is difficult to solve with an existing additive reaction type silicone rubber top coating, and thus an object of the present invention is to provide a coating fabric for an airbag having the advantages of a silicone topcoat, and having stable performance even after a long period of time passes and at high temperatures without causing deterioration of a base coating.

Means for Solving the Problems

As a result of extensive studies in order to solve the aforementioned problem, the present inventors discovered that the problem can be solved by using an oil-in-water silicone emulsion containing (c1) an ionic emulsifier and (c2) a polyoxyethylene-polyoxypropylene copolymerized nonionic emulsifier as a silicone binder, and particularly an oil-in-water silicone emulsion containing a polyorganosiloxane having at least two hydroxyl groups or hydrolyzable groups bonded to a silicon atom with a high degree of polymerization in one molecule, in which the amount of the combination of the aforementioned emulsifiers and component (c2) in a dry film is optimized, thereby arriving at the present invention.

Effects of the Invention

The aqueous coating film-forming composition of the present invention can be coated uniformly on a silicone rubber surface without causing repelling or coating failure even when applied in the silicone rubber surface at a film thickness of 30 μm or less, and forms an antifriction dry coating film that reduces friction and/or blocking of the substrate surface on the surface. Thereby, a uniform antifriction dry coating film can be formed on a substrate provided with a silicone rubber surface even with a small application weight, and thus a substrate provided with the dry coating film, and particularly an airbag or a coating fabric subsequently formed into an airbag can be provided.

Furthermore, even when a silicone rubber is used as a base coating material, the aqueous coating film composition of the present invention does not contain a component that reacts with the base coating material, and thus does not cause deterioration of a base coating even after a long period of time and at high temperatures. Therefore, using the aqueous coating film composition according to the present invention can provide a coated fabric for an airbag with stable performance over a long period.

BRIEF DESCRIPTION OF THE DRAWINGS

FIG. 1 is photographs of the vicinity of a fracture point of a No. 3 dumbbell after a tensile test when an aqueous coating film-forming composition is combined with a silicone base coating material for reference/comparative examples/examples. FIG. 1 includes a left photograph (untreated, reference experiment), a center photograph (comparative evaluation example), and a right photograph (example).

PREFERRED MODE FOR CARRYING OUT THE INVENTION

An aqueous coating film-forming composition of the present invention will be described below in detail. The aqueous coating film-forming composition of the present invention contains
  (A) a solid lubricant,
  (B) a thickener containing (b1) a water-soluble organic polymer and (b2) a clay mineral, and
  (C) a silicone binder in the form of an oil-in-water silicone emulsion containing (c1) an ionic emulsifier and (c2) a polyoxyethylene-polyoxypropylene copolymerized nonionic emulsifier, and may preferably further contain a flame retardant or other additive.

If a total amount dry film obtained by removing water content is 100 mass %, the aqueous coating film-forming composition contains 40 to 80 mass % of the solid lubricant (A), 0.50 to 10 mass % of the thickener (B), 0.60 to 5 mass % of polyoxyethylene-polyoxypropylene copolymerized nonionic emulsifier (c2), and 5 to 49.5 mass % of the silicone binder (solid fraction) (C), and can form an antifriction dry coating film that reduces friction and/or blocking of a substrate surface.

Hereinafter, the viscosity related to the aqueous coating film-forming composition of the present invention is a value as measured at 25° C. using a Wells-Brookfield Cone/Plate Viscometer provided with a 20 mm diameter 2° tapered cone, at a shear rate of 1 s-1 measured (ASTM D4287). Unless otherwise indicated, viscosities indicated for all aqueous dispersions of a thickener described in the present specification were measured using the same technique as described above.

[Solid Lubricant (A)]

The solid lubricant is a component that provides antifriction properties to a dry coating film obtained using the aqueous coating film-forming composition according to the present invention to reduce friction and/or blocking, and preferably contains phyllosilicate, also known as a layered silicate. Examples of phyllosilicates suitable for use as a solid lubricant in the present invention include mica, talc such as talc microspheres, kaolinite, smectite, sericite and chlorite. The solid lubricant may further or alternatively contain polytetrafluoroethylene (PTFE) or other fluoropolymer, or a polyolefin wax or other solid hydrocarbon wax. A particularly preferred solid lubricant is (A1) one or more types of solid lubricants selected from mica, talc, kaolinite, sericite, and chlorite.

The solid lubricant (A) may preferably be present at an amount of at least 1 wt %, or at least 3 wt % of the aqueous coating film composition including water or the like, prior to forming a dry film, for example, from 5 or 10 wt % to a maximum of 40 wt % of the aqueous coating film composition. In other words, the amount of component (A) may be within a range of 5 to 40 mass % of the total amount of the aqueous coating film composition including water, and is particularly preferably within a range of 10 to 35 mass % or 15 to 30 mass %.

From the perspective of achieving antifriction properties of a dry coating film obtained by removing water content from the present composition, if the total amount of the dry film is 100 mass %, the amount of the solid lubricant (A) is within a range of 40 to 80 mass %, preferably within a range of 45 to 80 mass %, and more preferably within a range of 50 to 80 mass %.

[Thickener (B)]

The thickener is a component that thickens the aqueous coating film-forming composition of the present invention to improve coatability, workability and storage stability, and also functions as a solid component included in a dry film. The thickener according to the present invention includes one or more types selected from (b1) water-soluble organic polymers and (b2) clay minerals, and a thickener in which these are premixed is particularly preferred.

The thickening performance of the thickener (B) is not particularly limited, but from the perspective of a technical effect of the present invention, thickening properties are preferably provided, where the viscosity of a 2 wt % aqueous dispersion of the thickener is at least 1,000 mPa·s at 25° C.

The water-soluble organic polymer (b1) is a component which can be modified by mixing with the clay mineral (b2), and forms a hydrophilic composite with the clay mineral. Note that in the present invention, only one type selected from (b1) the water-soluble organic polymers or (b2) the clay minerals may be used, but both may be and are preferably used in a mixture.

Specifically, examples of component (b1) can include water-soluble organic polymers such as high-molecular polysaccharides, water-soluble acrylic resins, and the like. In particular, the use of a water-soluble organic polymer containing a carboxylate group is preferred, and preferred examples include polyacrylates, which are carboxyl-containing attached polymers, such as sodium polyacrylates, sodium polymethacrylates, and the like.

The clay mineral (b2) may be natural or synthetic, and examples include natural or synthetic smectite clay such as bentonite, montmorillonite, hectorite, saponite, soconite, bidelite, nontronite, and the like; and aluminum silicate magnesium are exemplified. Smectite clay such as bentonite, montmorillonite, and the like are preferred. Such smectite clays are available, for example, as SUMECTON SA (manufactured by Kunimine Industries Co., Ltd.), which is a hydrothermally synthesized product, and BEN-GEL (manufactured by HOJUN., Co. Ltd.), which is a naturally refined product. Note that these clay minerals may be synthetic smectite clays, as disclosed in Patent Document 11, and synthetic smectite clays generally have a smaller particle size than natural smectite clays. For example, the average particle size is only 5 or 10% of the average particle size of natural smectite. Synthetic smectite clays have such small particle sizes, and therefore can be added in a smaller amount than natural smectite clays to produce a highly viscous aqueous gel composition.

When imparting heat resistance and flame retardance to a substrate (for example, fabric for an airbag or building material) to which the aqueous coating film-forming composition of the present invention is applied, the pH of these clay minerals such as smectite clay and the like is preferably within a pH range of 5.0 to 9.0.

The clay mineral (b2), such as a bentonite or montmorillonite, may be modified by premixing with the water-soluble organic polymer (b1). For example, the clay mineral and water-soluble organic polymer may be uniformly mixed in water, and the mixture may then be dried, for example by spray drying. The resulting dry mixture may be ground, if necessary, to a desired particle size, which may be within a range of 1 to 20 μm. The amount of water-soluble polymers in such a mixture may range, for example, from 0.1 wt % to 40 wt %.

Furthermore, optionally, the clay mineral (b2) may be modified by treatment using an alkyl alkoxysilane. For example, an alkyl alkoxysilane can be applied to the clay mineral as a genuine liquid silane or as a solution in an organic solvent.

The thickener (B) may be present, for example, in 0.1 or 0.2 wt % to 5 or 10 wt % of the coating film composition including water and the like prior to forming a dry film. An aqueous coating film composition containing 0.5 to 3% of the thickener is particularly preferred.

From the perspective of uniformity of application and workability when the composition containing water is applied thinly to a silicone rubber surface, if the total amount of the dry film is 100 mass %, the amount of the thickener (B) is within a range of 0.50 to 10 mass %, preferably within a range of 2 to 10 mass %, and more preferably within a range of 3 to 9 mass %. If the amount of the thickener (B) is less than the lower limit described above, even if the amount of component (c2) described later is within the scope of the present invention, uniform application may be insufficient or repelling may occur. On the other hand, if the amount of the thickener (B) exceeds the upper limit described above, the viscosity of the composition containing water may become excessively high, and the workability may deteriorate or the durability of the dry film may decrease.

[Component (C)]

The present invention has a characteristic of containing a silicone binder in the form of an oil-in-water silicone emulsion containing (c1) an ionic emulsifier and (c2) a polyoxyethylene-polyoxypropylene copolymerized nonionic emulsifier, as component (C). The aqueous coating film composition requires a binder to enhance close fitting properties of the solid lubricant (A) to a substrate such as an airbag fabric or the like. Although a suitable binder is a suitable silicone emulsion that cures into an elastomeric product, the present inventors discovered that a silicone rubber surface can be uniformly covered without repelling or coating failures occurring even if applied on a silicone rubber surface with a film thickness of 30 μm or less, by employing a combination of the aforementioned emulsifiers, preferably optimizing the amount used, and using an oil-in-water silicone emulsion containing a polyorganosiloxane having at least two hydroxyl groups or hydrolyzable groups bonded to a silicon atom with a high degree of polymerization in one molecule, as a binder.

[Emulsifiers: Components (c1) and (c2)]

The oil-in-water silicone emulsion serving as component (C) contains (c1) an ionic emulsifier and (c2) a polyoxyethylene-polyoxypropylene copolymerized nonionic emulsifier. When these emulsifiers are used in combination, the polyorganosiloxane, which is a main agent of component (C), and an optionally included alkoxysilane can be stably emulsified in water serving as a dispersing medium with a small particle size. In particular, when the polyorganosiloxane is formed by emulsion polymerization, the emulsion polymerization reaction can proceed stably to provide an oil-in-water type silicone emulsion, which is a highly stable emulsion polymerization reaction product. Furthermore, by using a binder containing a combination of these emulsifiers as the entire aqueous coating film-forming composition according to the present invention, the composition can be uniformly applied to a silicone rubber surface in the form of a thin film, and even with a small application weight, a uniform antifriction dry coating film can be formed on a substrate having a silicone rubber surface.

Herein, the polyoxyethylene-polyoxypropylene copolymerized nonionic emulsifier (c2) is not only an emulsifier of component (C), but is also an essential component for suppressing the repelling of a coating film and uniformly covering a silicone rubber surface on a substrate, particularly when the aqueous coating film-forming composition of the present invention is coated thinly on the silicone rubber surface. Furthermore, the aforementioned technical effect may not be sufficiently achieved if the amount of component (c2) is not sufficient. Furthermore, component (c2) may be and is preferably added to the aqueous coating film-forming composition of the present invention separately from the emulsifier of component (C).

An anionic surfactant, cationic surfactant, or amphoteric surfactant can be used as an ionic emulsifier serving as component (c1). One type of such surfactant may be used alone as an ionic emulsifier, and two or more surfactants of different types may be used in combination.

Examples of anionic surfactants include alkylbenzene sulfonate, alkyl ether sulfate, polyoxyethylene alkyl ether sulfate, polyoxyethylene alkyl phenyl ether sulfate, alkyl naphthyl sulfonate, unsaturated aliphatic sulfonate, and hydroxylated aliphatic sulfonate.

Examples of cationic surfactants include quaternary ammonium type salt surfactants, such as: octadecyl trimethyl ammonium chloride, hexadecyl trimethyl ammonium chloride, and other alkyl trimethyl ammonium salts; dioctadecyldimethyl ammonium chloride, dihexadecyldimethyl ammonium chloride, didecyldimethyl ammonium chloride, and other dialkyldimethyl ammonium salts; and the like.

Examples of amphoteric surfactants include alkylbetaines and alkylimidazolines.

Component (c2) is a polyoxyethylene-polyoxypropylene copolymerized nonionic emulsifier, which is usually a compound expressed by the following general formula (1) or general formula (2).

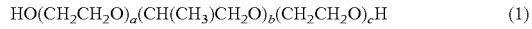

$$HO(CH_2CH_2O)_a(CH(CH_3)CH_2O)_b(CH_2CH_2O)_cH \quad (1)$$

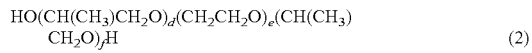

$$HO(CH(CH_3)CH_2O)_d(CH_2CH_2O)_e(CH(CH_3)CH_2O)_fH \quad (2)$$

In general formulae (1) and (2), a, b, c, d, e, and f are the average number of mols of ethylene oxide or propylene oxide added, and are each independently a number between 1 and 350. The weight average molecular weight of component (c2) is preferably 1,000 to 18,000, and more preferably 1,500 to 10,000. Component (c2) can be used in an aqueous solution, if in a solid form.

More specific examples of compounds serving as component (c2) include the Pluronic (registered trademark) L series, Pluronic (registered trademark) P series, Pluronic (registered trademark) F series, and Pluronic (registered trademark) TR series manufactured by ADEKA CORPORATION; Emulgen PP-290 manufactured by Kao Corporation; and Newcol 3240 manufactured by Nippon Nyukazai Co., Ltd., which are available on the market.

The blending amount of the ionic emulsifier of component (c1) is within a range of 1 to 100 parts by mass, preferably within a range of 1 to 50 parts by mass, and more preferably within a range of 1 to 20 parts by mass, relative to 100 parts by mass of polyorganosiloxane serving as a main agent of component (C).

The blending amount of component (c2) is within a range of 0.1 to 50 parts by mass, and preferably within a range of 1 to 20 parts by mass, relative to 100 parts by mass of polyorganosiloxane serving as a main agent of component (C). Note that the total blending amount of component (c1) and component (c2) is preferably 1 to 30 mass %, and more preferably 2 to 20 mass % of the total amount of the polyorganosiloxane serving as a main agent of component (C), an optionally included alkoxysilane, and the like.

Furthermore, the ratio of the blending amount of component (c1) to the blending amount of component (c2) is preferably within a range of 3:1 to 100:1. Note that when component (c2) is used in combination with component (c1) to emulsify the polyorganosiloxane or serving as a main agent of component (C) or a precursor component thereof, and an optional component such as another alkoxysilane or the like, the particle size of the resulting emulsion particles can be reduced as compared to using each component alone, and the stability of the oil-in-water silicone emulsion can be improved.

The oil-in-water silicone emulsion serving as component (C) is preferred from the perspective of being able to use the emulsifiers of components (c1) and (c2) described above to emulsify and disperse a cyclic siloxane, a diorganopolysiloxane blocked at both ends of a molecular chain with hydroxyl groups, organoalkoxysilanes, and the like in water, and then, if necessary, add a catalyst such as an acid, alkaline substance, or the like to perform a polymerization reaction, and being able to use the emulsifiers described above to emulsify and disperse in water a polyorganosiloxane having at least two groups selected from a group consisting of hydroxyl groups, alkoxy groups and alkoxyalkoxy groups bonded to a silicon atom and an aminoxy group-containing organic silicon compound having on average two aminoxy groups bonded to a silicon atom, and then performing the polymerization reaction, and particularly that a stable emulsion containing a high viscosity polyorganosiloxane can be obtained.

[Polyorganosiloxane in Component (C)]

The oil-in-water type silicone emulsion serving as component (C) has a structure in which a polyorganosiloxane is emulsified in water in the presence of components (c1) and (c2) described above. From the perspective of its function as a silicone binder, the polyorganosiloxane is a polyorganosiloxane having at least two groups selected from a group consisting of hydroxyl groups, alkoxy groups, and alkoxyalkoxy groups bonded to a silicon atom in one molecule, and is particularly preferably (c3) a polyorganosiloxane having at least two hydroxyl groups or hydrolyzable groups bonded to a silicon atom in one molecule, with a viscosity at 25° C. that is within a range of 100,000 mPa-s to 20,000,000 mPa-s.

A molecular structure of the polyorganosiloxane may be a straight chain, cyclic, branched, dendritic, or reticulated, but is preferably a straight chain or partially branched straight chain. The group selected from a group consisting of hydroxyl groups, alkoxy groups, and alkoxyalkoxy groups may be present at an end of the molecular chain, may be present on a side chain of the molecular chain, or may be present on both. The alkoxy group is preferably a methoxy group, ethoxy group, n-propoxy group, isopropoxy group, n-butoxy group, t-butoxy group, hexyloxy group, cyclohexyloxy group, octyloxy group, decyloxy group, or other alkoxy group having 1 to 10 carbon atoms, and the alkoxyalkoxy group is preferably a methoxymethoxy group, a methoxyethoxy group, an ethoxymethoxy group, a methoxypropoxy group, or other alkoxyalkoxy group having 2 to 10 carbon atoms.

Examples of an organic group bonded to a silicon atom other than group selected from a group consisting of hydroxyl groups, alkoxy groups and alkoxyalkoxy groups include unsubstituted monovalent hydrocarbon groups and substituted monovalent hydrocarbon groups. The non-substituted monovalent hydrocarbon groups preferably have 1 to 10 carbon atoms from the perspective of an emulsification assisting function, and is preferably an alkyl group having 1 to 10 carbon atoms, an aryl group having 6 to 10 carbon atoms, or an alkenyl group having 2 to 10 carbon atoms, and particularly preferably a methyl group or phenyl group.

Examples of the substituted monovalent hydrocarbon groups include groups where a portion or all hydrogen atoms in the aforementioned unsubstituted monovalent hydrocarbon groups, particularly alkyl groups or phenyl groups having 1 to 10 carbon atoms, is substituted by a substitution group such as: fluorine, chloride, or other halogen atom; an epoxy function group; a methacrylic functional group; an acrylic functional group; an amino functional group; a sulfur-containing functional group; an alkoxy group; a hydroxycarbonyl group; an alkoxycarbonyl group; or the like.

From the perspective of the strength and close fitting properties to a substrate of a cured film obtained by removing water content from the oil-in-water type silicone emulsion of the present invention, reduction of surface pressure-sensitive adhesion (tack) of the cured film, and reduction of friction, the viscosity of the polyorganosiloxane at 25° C. is preferably within a range of 100,000 to 20,000,000 mPa-s, more preferably within a range of 300,000 mPa-s to 10,000,000 mPa-s, even more preferably within a range of 500,000 mPa-s to 5,000,000 mPa-s, and most preferably within a range of 750,000 mPa-s to 3,500,000 mPa-s. If the viscosity of the polyorganosiloxane is less than the lower limit described above, the strength of the cured film obtained by removing water content from the oil-in-water type silicone emulsion and close fitting properties thereof to a substrate may be insufficient. Furthermore, surface pressure-sensitive adhesion of the cured film may occur, and thus a smooth surface of the dry coating film containing the solid lubricant (A) may not be achieved. On the other hand, emulsification is difficult for polyorganosiloxanes with a viscosity exceeding the upper limit described above.

Such a polyorganosiloxane is preferably a diorganopolysiloxane with both ends blocked by hydroxyl groups at both ends of a molecular chain, and an example includes a polyorganosiloxane expressed by the general formula: $HO(R^1{}_2SiO)_mH$. Note that in the formula, $R^1$ is the same as an unsubstituted or substituted monovalent hydrocarbon group bonded to a silicon atom other than the hydroxyl group or hydrolyzable group described above. m is an integer of 2 or more, and the viscosity at 25° C. is in the viscosity range described above and is preferably a number between 100,000 mPa-s and 20,000,000 mPa-s.

The method of manufacturing such a polyorganosiloxane is not particularly limited, and a polyorganopolysiloxane obtained by a known manufacturing method such as equilibrium polymerization or the like may be emulsified in water with an emulsifier such as component (c1) described later or the like. However, from the perspective of handling workability during manufacturing and particle size and stability during emulsification and dispersion, an organopolysiloxane obtained by emulsion polymerization using an organopolysiloxane with a lower degree of polymerization, which is a precursor of the polyorganosiloxane, can be preferably used.

It is particularly preferably (c3a) a polyorganosiloxane having at least two hydroxyl groups or hydrolyzable groups bonded to a silicon atom serving as a precursor of the polyorganosiloxane and (c3b) a polyorganosiloxane obtained by emulsion polymerizing an organic silicon compound containing an aminoxy group having an average of two aminoxy groups bonded to a silicon atom in one molecule, in the presence of the aforementioned component (c1) and component (c2).

The polyorganosiloxane (c3a) having at least two hydroxyl or hydrolyzable groups bonded to silicon atoms in one molecule serving as a precursor is a raw material component containing the polyorganosiloxane described above, and is preferably a chain polyorganosiloxane with a lower viscosity and having hydroxyl groups or hydrolyzable groups bonded to a silicon atom at both ends of a molecular chain. More specifically, component (c3a) is an organopolysiloxane blocked with hydroxyl groups at both ends of a molecular chain, having a viscosity at 25° C. of 100,000 mPa-s or less, and preferably within a range of 50 to 50,000 mPa-s, and is most preferably a polyorganosiloxane as expressed by $HO(R^1{}_2SiO)_nH$, where n represents a number in which the viscosity of component (a) at 25° C. is within the aforementioned viscosity range, and is preferably within a range of 50 to 50,000 mPa-s. Note that in the formula, $R^1$ is the same as an unsubstituted or substituted monovalent hydrocarbon group bonded to a silicon atom other than the hydroxyl group or hydrolyzable group described above, and is particularly preferably a methyl group or phenyl group.

The aminoxy group-containing organic silicon compound (c3b) having an average of two aminoxy groups bonded to a silicon atom in one molecule is a component for promoting the formation of a cured film having favorable surface hardness and rubber-like elasticity without a sense of pressure-sensitive adhesion by reacting and cross-linking with component (c3a).

Component (c3b) contains an aminoxy group bonded to an average of two silicon atoms in one molecule, and two aminoxy groups may be present on average only on a side chain of a molecular chain, may be present only at both ends of the molecular chain, or may be present on average in both an end of the molecular chain and a side chain of the molecular chain. If the average number of aminoxy groups in component (c3b) is three or more in one molecule, gelation of the mixture may occur inside an emulsifying device or in a pre-mixing process before emulsification. Furthermore, elongation of the resulting cured film may be inferior.

Such aminoxy group-containing organic silicon compounds include polydiorganosiloxanes blocked with aminoxy groups at both ends of a molecular chain, diorganosiloxane/organoaminoxysiloxane copolymers blocked with an aminoxy group at one end of a molecular chain, diorganosiloxane/organoaminoxysiloxane copolymers blocked with triorganosilyl groups at both ends of a molecular chain, cyclic diorganosiloxane/organoaminoxysiloxane copolymers, and diaminoxydiorganosilanes. Of these, polydiorganosiloxanes blocked with aminooxy groups at both ends of a molecular chain are preferred. The blending amount of component (c3b) is 0.1 to 100 parts by mass, preferably 0.5 to 50 parts by mass, and more preferably 1 to 20 parts by mass with regard to 100 parts by mass of component (c3a).

Component (c3b) is preferably expressed by general formula:

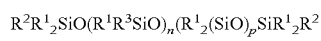

In the formula above, $R^1$ is the same as described above, but is preferably an alkyl group having 1 to 10 carbon atoms, an aryl group having 6 to 10 carbon atoms, or an alkenyl group having 2 to 10 carbon atoms, and particularly preferably a methyl group or phenyl group. $R^3$ is an aminoxy group. When n is zero, $R^2$ is an aminoxy group; when n is 1, one $R^2$ is an aminoxy group, and remaining $R^2$s are a group selected from a group consisting of unsubstituted monovalent hydrocarbon groups having 1 to 10 carbon atoms, halogen-substituted monovalent hydrocarbon groups having 1 to 10 carbon atoms, hydroxyl groups, alkoxy groups having 1 to 10 carbon atoms and alkoxyalkoxy groups having 2 to 10 carbon atoms; and when n is 2, $R^2$ is a group selected from a group consisting of unsubstituted monovalent hydrocarbon group having 1 to 10 carbon atoms, halogen-substituted monovalent hydrocarbon groups having 1 to 10 carbon atoms, hydroxyl groups, 1 to 10 alkoxy groups having 1 to 10 carbon atoms, and alkoxyalkoxy groups having 2 to 10 carbon atoms.

Examples of unsubstituted monovalent hydrocarbons include the same groups as described above, and a methyl group or a phenyl group is preferred. The halogen-substituted monovalent hydrocarbon group is a group in which a portion or all hydrogen atoms of the aforementioned unsubstituted monovalent hydrocarbon group are substituted with a halogen atoms, and is preferably a chloromethyl group, a 3,3,3-trifluoropropyl group, a 3,3,4,4,5,5,5-heptafluoropentyl, a difluoromonochloropropyl group, or other halogen-substituted alkyl group. Examples of the alkoxy group and the alkoxyalkoxy group include the same groups as described above.

Examples of the aminoxy group include groups selected from $—ON(R^4)_2$ and a group expressed by the following formula.

[Formula 1]

In the formula, $R^4$ is a straight chain or branched alkyl group having 1 to 5 carbon atoms. In the formula, $R^5$ is a divalent hydrocarbon group having 2 to 15 carbon atoms or a divalent organic group having a molecular main chain containing 3 to 17 carbon atoms and 1 to 3 nitrogen atoms or 1 to 2 oxygen atoms, and examples include: $—(CH_2)_2—$, $—(CH_2)_5—$, $—(CH_2)_6—$, $—(CH_2)_7—$, $—(CH_2)_2—O—(CH_2)_2—$, $—(CH=CH)—(CH=CH)—$, $—(CH=N)—(CH=CH)—$, $—(C_6H_4)—(CH_2)_2—$. Of these, $—(CH_2)_6—$ and $—(CH_2(CH_2)_2—O—(CH_2)_2—$ are preferred. Of these, a dialkyl aminoxy group in which an alkyl group with 1 to 5 carbon atoms is bonded to a nitrogen atom is preferred. Preferred examples of aminoxy groups include dimethyl aminoxy groups, diethyl aminoxy groups, dipropyl aminoxy groups, dibutyl aminoxy groups, diheptyl aminoxy groups, ethyl methyl aminoxy groups, propyl methyl aminoxy groups, propyl ethyl aminoxy groups, butyl methyl aminoxy groups, butyl ethyl aminoxy groups, butyl propyl aminoxy groups, heptyl methyl aminoxy groups, heptyl ethyl aminoxy groups, heptyl propyl aminoxy groups, and heptyl butyl aminoxy groups. A diethyl aminoxy group is preferred.

Furthermore, in the formula above, n is 0, 1 or 2, preferably 0 or 2, and more preferably 0. When n is 0, $R^2$ in the formula above is an aminoxy group, and when n is 1, at least one $R^2$ in the formula above is an aminoxy group. Of these, when n in the formula above is preferably 0, and $R^2$ is preferably an aminoxy group from the perspective of ease of availability.

In the formula, p is an integer of 0 or more. Although the upper limit of p is not particularly limited, from the perspective of ease of emulsification, p is preferably an integer within a range of 0 to 1000 more preferably within a range of 2 to 200, and most preferably within a range of 4 to 140.

Examples of such aminoxy group-containing organic silicon compounds include aminoxy group-containing organic silicon compounds as expressed by the following formulae. Note that in the formula, Me indicates a methyl group, Et indicates an ethyl group, and Pr indicates a propyl group.

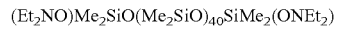

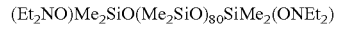

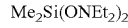

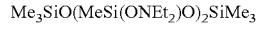

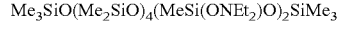

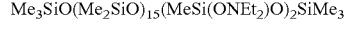

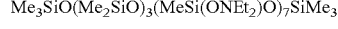

Note that if component (c3b) remains in the oil-in-water silicone emulsion, the component contributes to reaction/cross-linking between the polyorganosiloxane in the silicone binder and the optionally blended colloidal silica component, and can form a cured film with favorable surface hardness and rubber-like elasticity without a tacky feel.

[Colloidal Silica in Component (C)]

Component (C) of the present invention can and preferably also includes (c4) colloidal silica. Colloidal silica is a component for improving the strength of a cured film based on a silicone binder and improving the close fitting properties to a substrate, and is a component that can form a cured film having excellent friction reducing properties, that is smooth on a substrate surface, and has low surface pressure-sensitive adhesion (tack) because the oil-in-water emulsion serving as component (C) of the present invention contains a relatively large amount of colloidal silica as compared to component (A) as calculated by solid fraction.

Colloidal silica is available as an aqueous dispersion in which 5 to 40 mass % of silica particles is dispersed in water in a colloidal shape, and has many silanol groups on the surface. The particle size is generally approximately 1 nm to 1 µm. The colloidal silica is preferably a basic aqueous dispersion stabilized by sodium ions or ammonium ions. The pH of the colloidal silica serving as a basic aqueous dispersion is preferably 7.0 or higher, and more preferably above 9.0. The shape of the fine silica particles of the colloidal silica is not particularly limited and is generally spherical, but elongated or pearl necklace-shaped particles may also be used.

In the present invention, the blending amount of the colloidal silica (c4) in component (C) must be adjusted within a range of 5 to 120 parts by mass, and is preferably adjusted within a range of 10 to 110 parts by mass, and particularly preferably within a range of 20 to 100 parts by mass, as calculated by solid fraction, with regard to 100 parts by mass of the polyorganosiloxane (c3) having at least two hydroxyl groups or hydrolyzable groups bonded to a silicon atom in one molecule, with a viscosity at 25° C. within a range of 100,000 mPa·s to 20,000,000 mPa·s.

Herein, the solid fraction of the colloidal silica refers to a non-volatile silica particle fraction. In particular, when the blending amount of colloidal silica is within the aforementioned range, water is removed from the oil-in-water silicone emulsion composition of the present invention, and thus favorable smoothness can be imparted to the surface of a cured film primarily containing polyorganosiloxane or a cross-linked reaction product thereof. On the other hand, if the amount of colloidal silica is too low or too high, pressure-sensitive adhesion (tack) or cracks may occur on the surface of the cured film.

The colloidal silica (c4) can be added during or after polymerization when the polyorganosiloxane in component (C) is obtained by emulsion polymerization. Specifically, an aqueous dispersion of the colloidal silica particles containing water may be added to an emulsion containing the polyorganosiloxane, or an aqueous dispersion of the colloidal silica particles may be added to an emulsion containing the aforementioned component (c3a) or the like serving as a precursor of the polyorganosiloxane serving as component (c3) to advance an emulsion polymerization reaction.

Examples of such colloidal silica include SNOWTEX 20, SNOWTEX 30, and the like manufactured by Nissan Chemical Industries, Ltd.; ADELITE AT-20 and the like manufactured by Asahi Denka Co., Ltd.; KREVOSOL 30R9 and the like, manufactured by Clariant Japan; LUDOX (registered trademark) HS-40 and the like manufactured by DuPont; CATALOID S-20L and the like manufactured by JGC Catalysts and Chemicals Ltd.; SILICADOL S-20 and the like manufactured by Nippon Chemical Industrial Co., Ltd.; and the like.

Component (C) is an oil-in-water emulsion and contains water. The blending amount of water is preferably sufficient for maintaining a stable aqueous emulsion state, and the blending amount is not particularly limited. However, the amount of water derived from the aforementioned aqueous dispersion of colloidal silica and independent water is usually within a range of 5 to 95 mass % of the entire composition serving as component (C). When water content is removed in the aqueous dispersion of colloidal silica, the blending amount of water is 0 to 500 parts by mass, and preferably within a range of 10 to 200 parts by mass, with regard to 100 parts by mass of the polyorganosiloxane (c3) having at least two hydroxyl groups or hydrolyzable groups bonded to a silicon atom in one molecule, with a viscosity at 25° C. within a range of 100,000 mPa·s to 20,000,000 mPa·s.

The oil-in-water silicone emulsion composition serving as component (C) preferably contains (c5) an alkoxysilane or alkoxyalkoxysilane expressed by the general formula: $R^1_a SiX_{4-a}$, or a partially hydrolyzed condensation product of the alkoxysilane or alkoxyalkoxysilane, from the perspective of strength and close fitting properties of a cured film. R in the formula is the same as described above, and is preferably a methyl group or a phenyl group. X is an alkoxy group having 1 to 10 carbon atoms or an alkoxyalkoxy group having 2 to 10 carbon atoms, and examples include the same groups as described above. a is 0, 1 or 2, but is preferably 0 or 1. In particular, component (c5) is preferably a tetraalkoxysilane, alkyltrialkoxysilane, tetraalkoxyalkoxysilane, or alkyltrialkoxyalkoxysilane.

Component (c5) may be a partially hydrolyzed condensation product of the aforementioned organoalkoxysilane, organoalkoxyalkoxysilane, tetraalkoxysilane or tetraalkoxyalkoxysilane.

From the perspective of improving strength of a cured film and close fitting properties with a substrate, component (c5) is preferably blended at 0.1 to 50 parts by mass, and more preferably blended at 1 to 15 parts by mass with regard to 100 parts by mass of component (c3) described above. If the blending amount of component (c5) is less than 0.1 parts by mass relative to 100 parts by mass of component (c3), the strength of a cured film formed by removing water content from a produced aqueous silicone emulsion composition may not be sufficiently improved. If the blending amount exceeds 50 parts by mass, the amount of byproduct alcohol increases, which has a negative effect on the environment and the human body, and the formability of the cured film may change over time, which are not preferred.

In the oil-in-water silicone emulsion composition serving as component (C), (c6) an amine compound is preferably blended as a pH adjuster. Diethylamine is preferred as the amine compound. These components (c6) also function as curing catalysts, as described later, during water content removal, and therefore can promote condensation reactions of each component, and particularly can achieve curing reactivity free of heavy metals such as tin or the like.

The blending amount of component (c6) serving as a pH adjuster is preferably 0.01 to 5 mass %, and more preferably 0.1 to 2 mass % of the entire component (C).

[Other Optional Components]

The oil-in-water type silicone emulsion composition serving as component (C) may appropriately contain another component if necessary, with examples including pigments, defoaming agents, penetrating agents, antistatic agents, inorganic powders, preservatives, rust inhibitors, bis(trimethoxysilylpropyl)-disulfide and other silane coupling agents other than component (c5), pH adjusters other than component (c6), buffering agents, UV absorbers, curing catalysts, water-soluble resins, organic resin emulsions, pigments, dyes, and the like.

The average particle size (average primary particle size) of the silicone emulsion particles in the oil-in-water type silicone emulsion composition serving as component (C) may be within a range of 50 to 600 nm, preferably 300 nm or less, and particularly preferably 250 nm or less, from the perspective of storage stability, formability of a cured film, and stability when diluted in water. The average particle size of the emulsion particles can be measured by a dynamic light scattering method or the like.

[Blending Amount of Polyoxyethylene-Polyoxypropylene Copolymerized Nonionic Emulsifier (c2) in Dry Film]

As described above, component (c2) not only functions as an emulsifier for the silicone binder serving as component (C), but also, by including a certain amount or more thereof to the aqueous coating film-forming composition, can impart an effect of suppressing repelling or coating failures and uniformly covering a silicone rubber surface, particularly when the aqueous coating film-forming composition according to the present invention is applied onto the silicone rubber surface at a film thickness of 30 μm or less. Specifically, when the entire dry film is 100 mass %, the amount of component (c2) is within a range of 0.6 to 5 mass %, preferably within a range of 0.6 to 4 mass %, and even more preferably within a range of 0.6 to 3.5 mass %. If the amount of component (c2) is less than the lower limit described above, when the aqueous coating film-forming composition is thinly applied to a silicone rubber surface, repelling or coating failure may occur. Note that the effect is dependent on the blending amount of component (c2), and therefore, if a deficiency exists, the aforementioned technical effect may not be achieved even if a nonionic emulsifier other than component (c2) is added.

Component (c2) may be adjusted as the amount of emulsifier in component (C) to meet the aforementioned range, and may be added to the aqueous coating film-forming composition of the present invention separately from component (C). In particular, adopting a preparation method in which component (c2) is separately blended with component (C) into the composition of the present invention has an advantage where desired amount of component (c2) can be achieved without impairing the stability of component (C).

[Blending Amount of Silicone Binder in Dry Film]

The amount of the silicone binder in the form of an oil-in-water type silicone emulsion (C) can be selected as desired, but when the entire dry film is 100 mass %, the amount is within a range of 5 to 49.5 mass %, and particularly preferably within a range of 10 to 45 mass %. If the amount of component (C) exceeds the upper limit described above, the blending amount of component (A) and component (B), in particular, will be relatively small. Therefore, it may not be possible to achieve an object of the present invention of forming an antifriction dry coating film that reduces friction and/or blocking of a substrate surface. On the other hand, if the amount of component (C) is too low, the amount of the binder will be insufficient, and even if the amount of component (c2) satisfies the range described above, particularly when the film is applied to a silicone rubber surface with a thickness of 30 μm or less, repelling and coating failure may occur, and thus the silicone rubber surface may not be uniformly covered.

[Curing Catalyst]

Component (C) serving as the aqueous coating film-forming composition of the present invention or a binder thereof may contain a curing catalyst. In the present invention, blending of the curing catalyst is optional, but can be blended in order to promote quick cross-linking curing of the components of the composition of the present invention by a condensation reaction. Specific examples thereof include: organic tin compounds such as dibutyltin dilaurate, dibutyltin diacetate, octenoic acid tin, dibutyltin dioctate, laurate tin, dioctyl tin diversate, dioctyl tin diacetate, dibutyl tin bisoleyl malate, and the like; organic titanium compounds such as tetrabutyl titanate, tetrapropyl titanate, dibutoxybis(ethyl acetoacetate)titanium, and the like; in addition, acidic compounds such as hydrochloric acid, sulfuric acid, dodecylbenzene sulfonic acid, and the like; alkaline compounds such as ammonia, sodium hydroxide, and the like; amine based compounds such as n-hexylamine, guanidine, 1,8-diazabicyclo[5.4.0]undecene (DBU), 1,4-diazabicyclo[2.2.2]octane (DABCO), and the like; organic zirconium esters such as zirconium tetrapropylate, zirconium tetrabutylate, and the like; organic zirconium chelates such as zirconium tributoxy acetylacetonate, zirconium butoxyacetylacetonate bisethylacetoacetate, zirconium tetraacetylacetonate, and the like; zirconium based condensation co-catalysts of zirconium bis(2-ethyl hexanoate)oxide, zirconium acetylacetonate(2-ethyl hexanoate)oxide, and other oxozirconium compounds, and the like; aluminum alcoholate such as aluminum triethylate, aluminum triisopropylate, aluminum tri(sec-butylate), and the like; aluminum chelate compounds such as diisopropoxy aluminum (ethyl acetoacetate)aluminum tris(ethyl acetoacetate), aluminum tris(acetylacetonate), and the like; aluminum based condensation co-catalysts of hydroxy aluminum bis (2-ethyl hexanoate), and other aluminum acyloxy compounds, and the like; and condensation reaction catalysts of zinc stearate, zinc octylate, zinc acetate, iron octylate, and other organic acid metal salts, and the like. Note that unless these curing catalysts are water-soluble, the curing catalysts are preferably in the form of an emulsion emulsified and dispersed in advance in water using a surfactant. Furthermore, the amine compound (c6) that can be used in component (C) is a component that also functions as a curing catalyst, and using these components allows design of composition that does not contain a curing catalyst containing a metal such as tin or the like, which is preferred from the perspective of reducing impact on the environment.

The amount of the condensation reaction catalyst to be used in the aqueous coating film-forming composition of the present invention is not particularly limited and can be an arbitrary amount within a range in which an object of promoting a condensation reaction is achieved. However, the use of the condensation reaction catalyst is optional and does not need to be used in the present composition. Note that a composition containing a condensation reaction catalyst is described in U.S. Pat. No. 4,221,688, the contents of which are incorporated herein by reference. Furthermore, the binder may be prepared from a siloxane polymer and a suitable autocatalytic cross-linking agent, surfactant, and water. This type of composition is described, for example, in U.S. Pat. No. 5,994,459, the contents of which are incorporated herein by reference.

[Flame Retardant]

The aqueous coating film-forming composition of the present invention is preferably used in an airbag coating, and therefore may further contain a flame retardant. For example, the composition according to the present invention form an antifriction dry coating film that reduces friction and/or blocking of a substrate surface, and therefore is suitable in airbag coatings. However, it is important that airbags, by their very nature, are difficult to ignite and do not support combustion, and thus airbags generally require the addition of flame retardants in order to pass the rigorous flammability tests that may be applied to airbags. When an upper coating of the present invention is applied to a silicone rubber-coated airbag, there is generally no flammability problem. However, an upper coating without a flame retardant, which is applied to an organic resin-coated airbag, may not pass the US Federal Motor Vehicles Safety Standards Test FMVSS #302 (hereinafter referred to as "FMVSS #302") and other flammability tests. Therefore, the addition of a flame retardant is important for practical use.

In particular, the composition according to the present invention is suitable in coating agents used in an upper coating of an airbag or a coated fabric subsequently formed into an airbag, and the effect of the flame retardant is often most effective when present in the upper coating. An example of a preferred flame retardant is aluminum trihydrate that is preferably not surface treated. Furthermore, examples of flame retardants include other metal hydroxides such as magnesium hydroxide and the like, metal oxides such as ferrite oxide and titanium oxide and the like, carbonates such as zinc carbonate and the like, and carbon black. The amount of these flame-retardant components may be within a range of 2 to 40 mass %, and preferably 5 to 25 mass %, relative to the total amount of the composition, and a component in which at least a portion is aluminum trihydrate may be and is preferably selected as the flame retardant.

[Other Optional Components]

The aqueous coating film-forming composition of the present invention may optionally contain another component if necessary, such as pigments, defoaming agents, penetrating agents, dyes, antistatic agents, surfactants, preservatives, adhesion promoters, rust inhibitors, pH adjusters, buffering agents, UV absorbers, curing catalysts, water-soluble resins, and/or deodorants, for example, zeolite and/or activated carbon, and the like.

[Overall Viscosity of Composition and Viscosity Measurement Method]

The aqueous coating film-forming composition of the present invention has a viscosity of 1000 mPa·s or more from the perspective of uniform coatability and workability. The viscosity is measured at 25° C. using a Wells-Brookfield Cone/Plate Viscometer provided with a 20 mm diameter 2° tapered cone, at a shear rate of 1 s-1 measured (ASTM D4287).

Unless otherwise indicated, viscosities described in the present specification were measured using the same technique as described above.

[Application Method and Application Target]

The aqueous coating film-forming composition of the present invention may be applied to a substrate by various techniques. Different substances may require different coating methods. For example, a coating may be applied as an upper coating to a coated airbag or coated airbag fabric by roller application, curtain coating, spraying, or knife-over roller. Roller application is often preferred as an effective method of uniformly coating with a low coating weight. The amount of coating film composition that is transferred to a fabric is a function of the pressure on a roller and/or the depth of an etched surface during gravure. An upper coating is preferably applied at an coating amount of 10 g/m2 to a maximum of 100 g/m2 on a water content weight basis. A coating film weight of 1 g/m2 or more after drying can provide the required low coefficient of friction and prevent blocking.

The amount of an aqueous diluent (water and an arbitrary co-solvent mixed with water) in the aqueous coating film-forming composition according to the present invention may be controlled based on the viscosity required for a coating and the coating weight required. Typically, the coating film composition has a solid fraction content of 1.5 to 50 wt % and contains 98.5 to 50% of the aqueous diluent.

The aqueous coating film-forming composition of the present invention can generally be applied to an arbitrary substrate where reduced friction and/or reduced blocking is required. The coating film composition is particularly effective when applied as an upper coating on an airbag, or in other similar applications such as emergency chutes on aircraft, a hot air balloon, or the like, but can also be used to improve handling in other applications such as keypads, mold formation, coating of wires, and the like and in molding processes such as silicone molding processes and the like.

When the aqueous coating film-forming composition of the present invention is applied as an upper coating to a coated airbag or a coated airbag fabric, a base coating may be any known silicone rubber-based or organic resin-based cured product, and is not particularly limited. From the perspective of an airbag coating, the base coating is particularly preferably an organopolysiloxane composition, and the organopolysiloxane composition preferably contains: an organopolysiloxane having an aliphatic unsaturated hydrocarbon or hydrocarbonoxy substitution group; organic silicon cross-linking agent having at least three hydrogen atoms bonded to silicon; a catalyst capable of promoting a reaction between an Si—H group and the aliphatic unsaturated hydrocarbon or hydrocarbonoxy substitution; and a reinforcing filler. Such a base coating forms a silicone rubber layer by curing, and therefore is highly flexible and effective in sealing an airbag, but has a high coefficient of friction.

The aqueous coating film-forming composition of the present invention, when applied to a silicone rubber surface, has an advantage of being able to form a coating film with excellent uniformity without causing repelling or coating failure, even when applied in a thin film form at a low coating amount and a thickness of 30 g/m2 or less. Therefore, the aqueous coating film-forming composition has an advantage where an antifriction dry coating film that reduces friction and/or blocking can be formed on a surface of a substrate having the silicone rubber described above as a base coating with only a small amount of application while maintaining excellent flame retardancy. Therefore, the aqueous coating film-forming composition of the present invention and surface treatment thereby can be used to obtain a lightweight airbag with excellent flame retardance and antifriction properties, or a coated fabric subsequently formed into an airbag.

Furthermore, the aqueous coating film-forming composition of the present invention has an advantage with regard to a substrate using the aforementioned silicone rubber as a base coating. In other words, even when a silicone rubber is used as a base coating material, the aqueous coating film composition of the present invention does not contain a component that reacts with the base coating material, and thus does not cause deterioration of a base coating even after a long period of time and at high temperatures (for example, severe heat resistance conditions such as 107° C. for 408 hours and the like). Therefore, using the aqueous coating film composition according to the present invention can provide a coated fabric for an airbag with stable performance over a long period.

If the base coating is curable, the base coating is generally cured before an upper coating is applied. However, as an alternative method, the aqueous coating film-forming composition of the present invention may be applied to an uncured base coating to reduce friction and/or blocking, and the base coating composition and the coating film composition may be thermally cured together.

When a coating film for reducing friction and/or blocking is applied to a cured base coating, the coating for reducing friction and/or blocking can be cured at ambient temperature, or can be cured more rapidly at a higher temperature, such as a temperature within a range of 50 to 200° C., and particularly 100 to 150° C. One possible method of curing at high temperatures includes applying the coating film composition that reduces friction and/or blocking to a heated substrate, such as a coated airbag or airbag fabric immediately after heat curing the base coating.

The coating film of the present invention provides a low friction surface on the substrate to which the coating film is applied. When applied on a coating film having a high coefficient of friction, the coating film of the present invention reduces friction on the coated airbag surface and, as a result, reduces wear of an airbag, which may reduce pressure retention of the airbag when subjected to movement during vehicle use.

The coating film of the present invention also prevents blocking of a coated fabric surfaces, in other words, sticking of the coated surfaces to each other during storage or during tight packing in an airbag compartment of a vehicle. Such blocking can produce very high stress when the airbag expands, which can result in bag defects, either by tearing or by releasing of a base coating of silicone from a fabric.

The present invention is described by the following examples, and parts and percentages in the examples are based on weight, unless otherwise indicated.

EXAMPLES

These examples and comparative examples use MCT1, a modified clay mineral thickener containing bentonite and sodium polyacrylate, wherein the thickener is made by uniformly mixing bentonite in an aqueous solution of sodium polyacrylate, drying the mixture, and then crushing. MCT1 contains a mixture of sodium carbonate and polyacrylate at approximately 15%. A 1.5% aqueous solution of MCT1 has a viscosity of 20,000 mPa-s. The viscosity was measured at 25° C. using a Wells-Brookfield cone/plate viscometer equipped with a 20 mm diameter 2° tapered cone at a shear rate of 1 s-1 (ASTM D4287).

The present invention is described below in detail by means of examples and comparative examples. In the examples, the viscosity is measured at 25° C. The term parts in the blended amounts refers to mass parts, and the term % in the content refers to the mass %. Note that in the formula, Me represents a methyl group, and Et represents an ethyl group. Furthermore, the content of each component of the present invention in the dried film is clearly indicated in the table, based on the entire dried film being 100 mass %.

The silicone rubber coated nylon fabric for evaluation is made of a 46×46 weave nylon fabric coated with silicone rubber (LCF3760 A & B, an additive reaction type coating material for airbags made by DOW) with a hardness of 10° (JIS type A) applied at 100 g/m2 by knife coating.

[Evaluation of Cured Film and Application Properties]

The oil-in-water silicone emulsion composition (composition for coating film) of each example was applied to the coating surface of the silicone rubber-coated nylon airbag fabric using a bar coater at a wet application rate of 30 g/m2 or 15 g/m2, and then the application properties were evaluated. In addition, for each application rate, the coating was thermally cured at 140° C., and the following items were evaluated. The application rate was adjusted by changing the position of the bar coater.

Viscosity: Measured using a rheometer AR500 manufactured by TA Instruments.
Uniformity: Evaluated visually.
Blocking test: Two coated cloths were cut into 50×50 mm pieces, and the coated surfaces were placed on top of each other, a 1.0 kg cylindrical steel weight with a diameter of 75 mm was placed thereon, and then left in an oven at 150° C. for 24 hours. After removal from the oven, one end was fixed and the other end was pulled using a push-pull gauge, and if the cloths peeled apart with a force of 50 g or less, the result is a pass.

[Evaluation of Physical Properties in Combination with Silicone Base Coat Material]

Rubber properties: Silicone rubber with a hardness (JIS type A) of 10 degrees was cured in a mold and a press at a temperature of 150° C. for 5 minutes to produce a rubber sheet with a thickness of 1 mm. The top coat agent was applied to one side at an application weight of 12 g/m2, and then cured by heating in an oven at 150° C. for 30 seconds. A heat aging test was then conducted in a 107° C. oven for 408 hours.

After removing from the heat aging test and leaving at room temperature for one day, the hardness was measured and a tensile test was performed using a JIS No. 3 dumbbell.

Example 1

92.5 parts of (a) polydimethylsiloxane capped with a hydroxydimethylsiloxy group at both ends of the molecular chain and having a viscosity of 2400 mPa-s and 7.5 parts of (b) polysiloxane containing an aminoxy group expressed by Formula (1): Et2NO(Me2SiO)7NEt2 were uniformly blended in a pre-blended dispersion containing 3.75 parts of (c2) polyoxyethylene-polyoxypropylene copolymer type nonionic emulsifier (Product name: Pluronic (registered trademark) F108 manufactured by Adeka) and 12.5 parts of (c1) a 40% aqueous solution of sodium alkane sulfonate, and emulsified in an emulsifier. 86 parts of (D) water, 44.0 parts of (B-1) colloidal silica (Product name: Snowtex 3 0 produced by Nissan Chemical, active ingredient 30%, pH 10, colloidal silica surface stabilized with sodium), and 1.25 parts of (G) diethylamine were added to the emulsion that was obtained, and then uniformly blended. In addition, 2.5 parts of (F) methyltriethoxysilane was added, uniformly blended, and allowed to stand at room temperature for 2 weeks to prepare an oil-in-water silicone emulsion base.

The viscosity of the reacted organopolysiloxane (A) obtained by emulsion polymerization was measured by the following procedure. 92.5 parts of (a) polydimethylsiloxane capped with a hydroxydimethylsiloxy group at both ends of the molecular chain and having a viscosity of 2400 mPa-s and 7.5 parts of (b) polysiloxane containing an aminoxy group expressed by Formula (1): Et2NO(Me2SiO)7NEt2 were uniformly blended in a pre-blended dispersion containing 7.5 parts of (c2) polyoxyethylene-polyoxypropylene copolymer type nonionic emulsifier (Product name: Pluronic (registered trademark) F108 manufactured by Adeka) and 12.5 parts of (c1) a 40% aqueous solution of sodium alkane sulfonate, and emulsified in an emulsifier. After allowing to sit for one week, 10 g of isopropyl alcohol was added to 10 g of the prepared emulsion while stirring, and only the precipitated dimethylsiloxane was dried at 105° C. for 3 hours, and measured using a Brookfield type viscometer. The viscosity at 25° C. was 1,800,000 mPa-s.

73.54 parts of (B-2) colloidal silica and 0.5 parts of (C2) an additional emulsifier component (Product name Pluronic (registered trademark) F108) were uniformly blended in 100 parts of the resulting oil-in-water type silicone emulsion base to obtain silicone emulsion No. 1.

12 parts of the silicone emulsion (No. 1) obtained above was uniformly blended with a dispersion made by blending 73 parts of (E) 1.5% aqueous solution of an anionic polymer composite purified bentonite (product name: Venger W100U: Hojun Co., Ltd.) and 15 parts of talc powder, to obtain the oil-in-water silicone emulsion composition of the present invention (film composition).

When the resulting oil-in-water silicone emulsion was allowed to sit at 25° C., no separation was observed even after 6 months, and the dispersion state was stable. In addition, when evaluated by the method described above, a hardened film could be formed. The evaluation results are shown in Table 1.

Evaluation of Physical Properties of a Combination of Silicone Base Coat Material and the Top Coat Agent for the Examples and Comparative Examples The oil-in-water silicone emulsion of Example 1 was used as a top coat material by the method described above, and when combined with a silicone base coat material, the effect on the physical properties of the silicone rubber was confirmed. On the other hand, the effect on the physical properties of the silicone rubber was compared by using an addition reaction type silicone rubber top coat agent (product name: DC3715 BASE/CURING AGENT manufactured by DOW) in place of the oil-in-water silicone emulsion of Example 1, in combination with the silicone base coat material using the aforementioned method. As a reference test, an unprocessed rubber sheet with a thickness of 1 mm was prepared without applying the top coat agent by the method described above.

The evaluation results thereof are shown in Table 2 and FIG. 1. Herein, FIG. 1 are photographs of samples after the heat aging test in a 107° C. oven for 408 hours, including the left photograph (unprocessed, reference test), the center photograph (comparative evaluation example), and the right photograph (Example 1).

Example 2

A silicone emulsion (No. 2) and a coating composition were prepared by the same method as Example 1, except that the amount of added emulsifier component (product name: Pluronic (registered trademark) F108 was changed to 1.5 parts, and the evaluation was carried out by the same method as Example 1. The evaluation results are shown in Table Comparative Example 1

A silicone emulsion (No. 3) and a coating composition were prepared by the same method as Example 1, except that the additional emulsifier component was not added, and the evaluation was carried out by the same method as Example 1. The evaluation results are shown in Table 1.

Comparative Example 2

A silicone emulsion (No. 4) and a coating composition were prepared by the same method as Example 1, except that the additional emulsifier component was changed to 1.0 parts of a nonionic emulsifier (product name LUTENSOL (registered trademark) XP30 produced by BASF) primarily containing C10 gerbe alcohol ethoxylate, and the evaluation was carried out by the same method as Example 1. The evaluation results are shown in Table 1.

Comparative Example 3

A silicone emulsion (No. 5) and a coating composition were prepared by the same method as Example 1, except that the additional emulsifier component was changed to 1.0 parts of a viscosity adjusting agent (Primal ASE 60 produced by Rohm and Haas), and the evaluation was carried out by the same method as Example 1. The evaluation results are shown in Table 1.

TABLE 1

| Composition | Example 1 | Example 2 | Comparative Example 1 | Comparative Example 2 | Comparative Example 3 |
| --- | --- | --- | --- | --- | --- |
| MCT-1 1.5% aqueous solution | 73.00 | 73.00 | 73.00 | 73.00 | 73.00 |
| Talc | 15.00 | 15.00 | 15.00 | 15.00 | 15.00 |
| Silicone emulsion (No. 1) | 12.00 | | | | |
| Silicone emulsion (No. 2) | | 12.00 | | | |
| Silicone emulsion (No. 3) | | | 12.00 | | |
| Silicone emulsion (No. 4) | | | | 12.00 | |
| Silicone emulsion (No. 5) | | | | | 12.00 |
| Dry film (solid fraction) (%) | 21.08 | 21.12 | 21.06 | 21.10 | 21.10 |
| Solid lubricant in solid fraction (%) | 71.15 | 71.01 | 71.22 | 71.08 | 71.08 |
| Thickener in solid fraction (%) | 5.19 | 5.18 | 5.20 | 5.19 | 5.19 |
| Si binder in solid fraction (%) | 23.66 | 23.80 | 23.59 | 23.73 | 23.73 |
| Total amount of dry film (solid fraction) (%) | 100.00 | 100.00 | 100.00 | 100.00 | 100.00 |
| (c2) Pluronic F108 in solid fraction (%) | 0.65 | 0.97 | 0.49 | 0.49* | 0.49** |
| Viscosity (mPa·s) Shear rate 1(1/s) | 31,400 | 59,500 | 29,300 | 24,200 | 31,300 |

TABLE 1-continued

| Composition | Example 1 | Example 2 | Comparative Example 1 | Comparative Example 2 | Comparative Example 3 |
|---|---|---|---|---|---|
| Viscosity (mPa-s) Shear rate 10(1/s) | 4,220 | 5,269 | 3,940 | 2,900 | 4,100 |
| Application rate 30 g/m2 | | | | | |
| Repelling at time of application | None | None | Some | Some | Cracks generated |
| Blocking test | Pass | Pass | Pass | Pass | Fail |
| Application rate 15 g/m2 | | | | | |
| Repelling at time of application | Some | None | Cracks generated | Cracks generated | Cracks generated |
| Blocking test | Pass | Pass | Fail | Fail | Fail |

*Systems with additional nonionic emulsifiers other than component (C2)
**Systems with additional viscosity adjusting agent

TABLE 2

| Topcoat agent | Un-processed | Comparative evaluation example | Example 1 |
|---|---|---|---|
| Hardness (JIS Type-A) | 27 | 30 | 27 |
| Tensile strength (MPa) | 10.1 | 5.9 | 10.1 |
| Elongation % | 1060 | 790 | 1075 |
| Photograph of FIG. 1 | Left | Center | Right |
| Presence of surface cracks | No cracks | Cracks present | No cracks |

SUMMARY

The aqueous film-forming composition (=coating composition) of Examples 1 and 2 satisfies the composition of the present invention, has a viscosity that can be applied, and can be applied uniformly on the silicone rubber whether the application amount is 30 g/m2 or a thinner application amount of 15 g/m2, and thus it is possible to form a thin dry coating film that is light, has excellent uniformity, and does not cause blocking between coating films.

In contrast, in Comparative Examples 1 to 3, the amount of (C2) component was insufficient, and when applied at an application rate of 30 g/m2, blistering can easily occur as compared with the Examples, and in particular, when applied at a thin application rate of 15 g/m2, a coating film having sufficient uniformity cannot be formed as a result of blistering on the silicone rubber. Therefore, both compositions of Comparative Example 1 and Comparative Example 2 were thinly applied on the silicone rubber, and thus a coating film having excellent functionality was difficult to obtain. In addition, when a viscosity adjusting agent was added in place of the (C2) component, it is not possible to uniformly apply the film on the silicone rubber, even when the application rate was 30 g/m2.

As a result of evaluating the effect on the silicone rubber base coat material, as shown in Table 2, elongation as low as 790% was obtained using the additive reaction type silicone rubber top coat agent currently in use (comparative evaluation example), compared to the elongation of 1060% for unprocessed silicone rubber. On the other hand, when the aqueous coating film-forming composition of Example 1 (=coating composition) was used as the top coat agent, no decrease in elongation was observed. Furthermore, as a result of observing the vicinity of the fracture point of the dumbbell after the tensile test, unlike the left photograph (unprocessed, reference test) and the right photograph (Example 1), fine cracks on the surface appeared only in the center photograph of the rubber that was processed with an additive reaction type silicone rubber top coat agent (comparative evaluation example). This is presumed to be due to the fact that the cross linking component contained in the addition reactive type silicone rubber top coat agent solidified due to reaction on the surface of the silicone base coat. On the other hand, it is hypothesized that the top coat agent of Example 1 of the present invention did not undergo a reaction with the silicone base coat material and there was no degradation of the base coat material, so no cracks were observed, similar to the unprocessed case.

[Evaluation Test Example Using Bag Fabric (Fabric Bag with a Base Coat Made of Silicone Rubber)]

A silicone rubber coated bag fabric was produced by applying silicone rubber cured by an additive reaction and having a hardness (JIS Type A) of 10° at an application rate of 60 g/m2 onto both surfaces of a bag woven material made of nylon (registered trademark) 66 with a decitex of 470, a warp density of 46 strands/inch and a weft density of 46 strands/inch, having a bag shape with an interior space volume of 5 liters, and the interior space is equipped with a gas inlet, and then the silicone rubber was cured by heating at 180° C. for 2 minutes. (reference test). Note that the silicone rubber coated bag fabric corresponds to a base fabric bag with a base coat containing silicone rubber.

A silicone rubber coated woven bag fabric was manufactured in the same manner as described above, and then the top coat agent is applied to the fabric at an application rate of 12 g/m2, and is then cured by heating in an oven at 150° C. for 30 seconds. Next, a heat aging test was performed in an oven at 107° C. for 408 hours, the fabric was left at room temperature for one day, and then a gas with a pressure of 125 kPa was blown into the inner space of the bagged fabric from the gas inlet to make the pressure of the inner space 70 kPa. The gas inlet was immediately closed and the rate of pressure drop in the internal space was measured.

With the currently used addition reaction silicone rubber top coat agent, the rate of pressure drop was significantly higher than that of a bag coated only with an unprocessed silicone rubber top coat, but when the unprocessed aqueous coating composition of Example 1 (=coating composition) was used as the top coat agent, the rate of pressure drop in the inner space was equivalent to that of the bag coated only with the silicone rubber system of the reference test, and there were not problems with deterioration in reliability caused by degradation or cracking in the base fabric provided with the base coat made of silicone rubber that was cured by an addition reaction.

INDUSTRIAL APPLICABILITY

The aqueous coating film-forming composition of the present invention forms an antifriction dry coating film that has rubber-like elasticity and reduces friction and/or blocking of a substrate surface to that surface when applied onto or impregnated in a substrate and then the water is removed, and thus can be used as a water-based paint or ink, as a coating agent for a heat sensitive paper or inkjet paper, as a release agent for molds and rubbers, as a resin coating agent for automotive weather stripping, gaskets, rubber hoses, and the like, as a fiber treatment agent for clothing and airbags, or as a release agent, cosmetic, building material, or the like.

Furthermore, when the aqueous coating film-forming composition of the present invention is used on an airbag for surface treatment with silicone rubber, a reaction with the base coat does not occur, and thus the flexibility of the silicone base coat can be maintained even in an environment where the airbag is left at a high temperature for a long time, and thus airbag performance can be maintained for a long period of time in this type of environment.

What is claimed is:

1. An aqueous coating film-forming composition for forming an antifriction dry coating film that reduces friction and/or blocking of a surface of a substrate, the composition comprising:
   (A1) a solid lubricant selected from one or more types of solid lubricants selected from the group consisting of mica, talc, kaolinite, sericite, and chlorite;
   (B1) one or more types of thickeners selected from the group consisting of (b1) water-soluble organic polymers and (b2) clay minerals, wherein the thickener comprises as a clay mineral one or more types selected from the group consisting of saponites, bentonites, and montmorillonites, and has viscosity thickening properties where the viscosity of a 2 wt % aqueous dispersion of the thickener is at least 1000 mPa·s; and
   (C) a silicone binder in the form of an oil-in-water silicone emulsion comprising:
   100 parts by mass of (c3) a polyorganosiloxane having at least two hydroxyl groups or hydrolyzable groups bonded to a silicon atom in one molecule, where the viscosity at 25° C. is within a range of 100,000 mPa·s to 20,000,000 mPa·s;
   5 to 120 parts by mass of (c4) colloidal silica, as calculated by solid fractions;
   1 to 100 parts by mass of (c1) an ionic emulsifier;
   0.1 to 50 parts by mass of (c2) a polyoxyethylene-polyoxypropylene copolymerized nonionic emulsifier; and
   0 to 500 parts by mass of water, excluding water content in the colloidal silica (c4);
   wherein component (c3) is
   (c3a) a polyorganosiloxane having at least two hydroxyl groups or hydrolyzable groups bonded to a silicon atom serving as a precursor of component (c3) and
   (c3b) a polyorganosiloxane obtained by emulsion polymerizing an organic silicon compound containing an aminoxy group having an average of two aminoxy groups bonded to a silicon atom in one molecule, in the presence of components (c1) and (c2);
   wherein 5 to 40 mass % of the entire composition including water content is component (A1); and
   wherein
   if the total amount of a dry film obtained by removing water content is 100 mass %,
   the amount of solid lubricant (A1) is 40 to 80 mass %;
   the amount of thickener (B1) is 0.50 to 10 mass %;
   the amount of polyoxyethylene-polyoxypropylene copolymerized nonionic emulsifier (c2) is 0.60 to 0.97 mass %; and
   the amount of silicone binder (C), solid fraction, is 5 to 49.5 mass %.

2. The aqueous coating film-forming composition according to claim 1, wherein component (c3b) is expressed by the general formula:

$R^3R^1_2(R^1_2(SiO)_pSiR^1_2R^3$ where each $R^3$ is an aminoxy group, each $R^1$ is an alkyl group having 1 to 10 carbon atoms, an aryl group having 6 to 10 carbon atoms, or an alkenyl group having 2 to 10 carbon atoms, and p is an integer of 2 to 200.

3. The aqueous coating film-forming composition according to claim 1, wherein the silicone binder serving as component (C) is an oil-in-water silicone emulsion comprising 100 parts by mass of component (c3) and 20 to 100 parts by mass of the colloidal silica (c4), as calculated by solid fractions, and in which the average primary particle size of emulsion particles is within a range of 50 to 600 nm.

4. The aqueous coating film-forming composition according to claim 1, wherein the thickener serving as component (B1) is a thickener obtained by premixing the water-soluble organic polymer (b1) and clay mineral (b2), and component (b1) is within a range of 0.1 to 40 mass % of the entire component (B1).

5. The aqueous coating film-forming composition according to claim 1, further defined as a coating agent for an airbag or for a coating fabric formed into an airbag.

6. A method of manufacturing the aqueous coating film-forming composition according to claim 1, comprising a step of mixing water, (A1) a solid lubricant, (B1) a thickener obtained by premixing (b1) a water-soluble organic polymer and (b2) a clay mineral, and an oil-in-water silicone emulsion comprising (c1) an ionic emulsifier and (c2) a polyoxyethylene-polyoxypropylene copolymerized nonionic emulsifier.

7. An antifriction dry coating film formed from the aqueous coating film-forming composition according to claim 1, wherein the antifriction dry coating film reduces friction and/or blocking of a substrate surface on a substrate provided with a silicone rubber surface.

8. A substrate having an antifriction dry coating film that reduces friction or blocking on a substrate surface, obtained by removing water content from the aqueous coating film-forming composition according to claim 1.

9. The substrate according to claim 8, wherein the dry coating film has a structure that is overcoated on a silicone rubber surface.

10. The substrate according to claim 8, wherein the substrate is an airbag or a coating fabric subsequently formed into an airbag.

11. An airbag, comprising a structure where a silicone rubber surface on a substrate is coated with a dry coating film obtained by removing water content from the aqueous coating film-forming composition according to claim 1.

* * * * *